(No Model.)

F. G. TAYLOR.
WHEEL TIRE.

No. 496,671. Patented May 2, 1893.

WITNESSES:
Henry J. Miller
Chas. H. Luther Jr.

INVENTOR:
Frederick G. Taylor
By Joseph A. Miller & Co.
Atty's

UNITED STATES PATENT OFFICE.

FREDERICK G. TAYLOR, OF CRANSTON, RHODE ISLAND.

WHEEL-TIRE.

SPECIFICATION forming part of Letters Patent No. 496,671, dated May 2, 1893.

Application filed November 25, 1892. Serial No. 453,013. (No model.)

*To all whom it may concern:*

Be it known that I, FREDERICK G. TAYLOR, of Cranston, in the county of Providence and State of Rhode Island, have invented certain new and useful Improvements in Wheel-Tires; and I hereby declare that the following is a full, clear, and exact description of the same, reference being had to the accompanying drawings, forming part of this specification.

This invention has reference to improvements in wheel-tires which are constructed of a combination of elastic and metallic parts.

The object of the invention is to produce a cushioned wheel-tire which will be more durable in construction than those heretofore manufactured.

Another object of the invention is to produce an inflatable wheel-tire the expansion of the tread portion of which will be limited to certain degrees.

The further object of the invention is to produce a wheel-tire having a simple and effective valve through which air may be forced to inflate the tire.

Still further the object of the invention is to produce a wheel-tire which can be more securely fastened to the wheel-rim than those heretofore constructed.

The invention consists in the peculiar construction of the tire and the novel combination therein of the parts of which it is composed, as will hereinafter be more fully described and pointed out in the claims.

Figure 1:
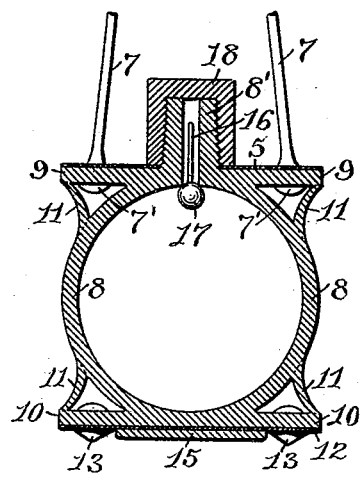
Figure 2:
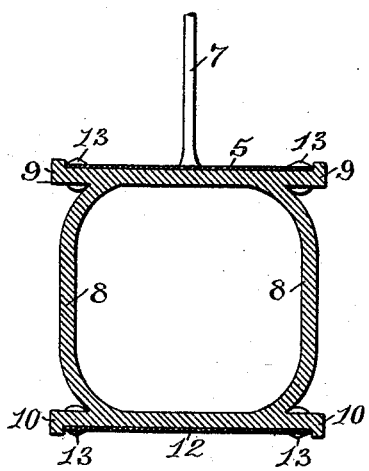
Figure 3:
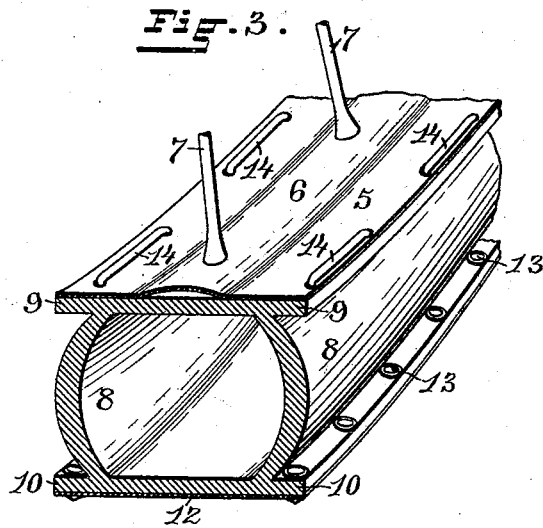

Figure 1 represents a cross-sectional view of an inflatable wheel-tire illustrating the principles of my invention and showing the construction of the improved valve. Fig. 2 represents a similar view of a portion of a wheel-tire still further illustrating my invention. Fig. 3 is a perspective view of section of tire.

Similar numbers of reference designate corresponding parts throughout.

In the drawings 5 indicates the wheel-rim, or felly of a wheel, which is particularly adapted for use on bicycles; this wheel-rim may have the central-groove 6 in which the spokes 7—7 are secured, as shown in Fig. 3, and is generally perforated to allow the air-valve to extend through the same.

The elastic tire has a cross-sectional shape, which is fully illustrated in the drawings, being built up from a combination of layers of textile fabric and rubber and having an inflatable tubular-portion 8 from the upper portion of which extend the longitudinal securing-lips 9—9, while from the lower or tread portion extend the similar lips 10—10. The outer surface of the tubular portion may be provided with the strips 11—11, the loose edges of which may be cemented to the lips 9 and 10 after the elastic portion of the tire has been secured to the wheel-rim and tread, or the edges of the lips 9 and 10 may be extended sufficiently to be secured to the sides of the tubular-portion 8. The outer portions of the lips 9 and 10 may be recessed, as shown in Fig. 2, to receive the wheel-rim 5 and the metallic tread-plate 12, and these may be secured to the elastic portion of the tire by the rivets 13, or by the lacings 14, these lacings may be threaded through perforations formed in the wheel-rim and may extend longitudinally of the tire or across the same. When the spokes 7 are arranged as shown in Fig. 1 of the drawings, the heads 7'—7' of the same may form rivets for securing the lips 9—9 and the wheel-rim together, but when the outer surfaces of the lips 9 and 10 are recessed, as shown in Fig. 2 of the drawings, the rivets 13 may be omitted.

The metallic-tread 12 is formed of a thin continuous strip, generally of mild steel, the length of which is slightly less than the circumferential length of the elastic portion of the tire when expanded, it may be flat as shown in the drawings, or may be slightly corrugated, either longitudinally or cross-wise, to insure a better grip on the ground,—when desirable an additional tread 15 of rubber, leather, or textile material, may be secured to the outer surface of the tread-plate, this piece being of slight cost can be replaced from time to time.

The improved valve has a tapering elastic-stem 8' the perforation in which extends through the wall of the tubular-portion 8 of the tire, and in this perforation is secured the upper end of the elastic-cord 16 to the lower end of which is fastened the rubber ball-valve 17,—the outer tapering surface of the stem 8' is screw-threaded and a cap 18 is provided to screw onto the stem to prevent the egress of air contained in the tire. When air is forced into the tire through the valve-stem 8' the ball 17 will be driven downward, stretching the cord 16 and allowing the air to enter, but, when the air-pump is removed, the pressure within the tire will force the ball 17 partially into the lower end of the perforation of the valve-stem effectually closing the same; by the use of an elastic stem the cap 18 may be more-securely held in position, the stem forming an elastic locking-device which continually draws the lower edge of the cap against the wheel-rim 5, the upper end of the stem is also slightly compressed by the top of the cap, thus insuring a tight joint.

Having thus described my invention, I claim as new and desire to secure by Letters Patent—

1. An elastic wheel-tire having a central tubular portion, longitudinal securing-lips, as described, and an outer metallic-tread.

2. The combination, in a wheel-tire, with the tubular-portion 8 having the securing-lips 9—9 and 10—10 and the strips 11—11, of the metallic-strip 12 and the outer strip 15 formed of yielding material, as described.

3. The combination with the tubular-portion having the securing-lips 9—9 and 10—10, of the valve-stem 8' formed of elastic material, screw-threaded on its outer surface, and the screw-cap 18 for closing the valve-stem, as described.

In witness whereof I have hereunto set my hand.

FREDERICK G. TAYLOR.

Witnesses:
HENRY J. MILLER,
M. F. BLIGH.